United States Patent
Gao

(10) Patent No.: US 11,445,201 B2
(45) Date of Patent: Sep. 13, 2022

(54) VIDEO ENCODING AND DECODING METHOD, DEVICE, AND SYSTEM, AND STORAGE MEDIUM

(71) Applicant: ZTE CORPORATION, Guangdong (CN)

(72) Inventor: Junping Gao, Guangdong (CN)

(73) Assignee: ZTE CORPORATION

(*) Notice: Subject to any disclaimer, the term of this patent is extended or adjusted under 35 U.S.C. 154(b) by 0 days.

(21) Appl. No.: 17/052,256

(22) PCT Filed: Apr. 28, 2019

(86) PCT No.: PCT/CN2019/084836
§ 371 (c)(1),
(2) Date: Nov. 2, 2020

(87) PCT Pub. No.: WO2019/210822
PCT Pub. Date: Nov. 7, 2019

(65) Prior Publication Data
US 2021/0377542 A1 Dec. 2, 2021

(30) Foreign Application Priority Data
May 2, 2018 (CN) .......................... 201810410250.0

(51) Int. Cl.
*H04N 19/14* (2014.01)
*H04N 19/169* (2014.01)
(Continued)

(52) U.S. Cl.
CPC .......... *H04N 19/14* (2014.11); *H04N 19/176* (2014.11); *H04N 19/186* (2014.11); *H04N 19/188* (2014.11)

(58) Field of Classification Search
None
See application file for complete search history.

(56) References Cited

U.S. PATENT DOCUMENTS

| | | | |
|---|---|---|---|
| 6,567,559 B1 * | 5/2003 | Easwar | G06T 9/00 |
| | | | 382/245 |
| 6,853,755 B2 * | 2/2005 | Li | G06T 9/00 |
| | | | 382/172 |

(Continued)

FOREIGN PATENT DOCUMENTS

| CN | 1687969 A | 10/2005 |
|---|---|---|
| CN | 101640754 | 2/2010 |

(Continued)

OTHER PUBLICATIONS

State Intellectual Property Office of People's Republic of China, Notification of First Office Action for Application No. 201810410250.0, report dated May 6, 2021, China.

(Continued)

*Primary Examiner* — Mohammad J Rahman
(74) *Attorney, Agent, or Firm* — McDonald Hopkins LLC

(57) ABSTRACT

Provided are video encoding and decoding methods and apparatuses, a video encoding and decoding system, and a storage medium. The video encoding method includes: performing macroblock division on pixel data of a screen change area, classifying, according to pixel data in a divided macroblock, the divided macroblock as a text macroblock or an image macroblock; determining a compression type of the text macroblock according to color data in the text macroblock; and performing encoding and compression, according to the compression type of the text macroblock, on the text macroblock with a corresponding compression quality.

13 Claims, 5 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 8,045,801 | B2* | 10/2011 | Kanatsu | H04N 19/162 382/176 |
| 8,648,858 | B1* | 2/2014 | Swenson | H04N 19/176 345/428 |
| 10,652,583 | B2* | 5/2020 | Chang | H04N 19/27 |
| 2002/0001412 | A1* | 1/2002 | Konstantinides | G06T 9/005 382/239 |
| 2002/0168105 | A1* | 11/2002 | Li | G06T 9/00 382/239 |
| 2004/0001634 | A1* | 1/2004 | Mehrotra | G06T 9/00 382/233 |
| 2006/0115169 | A1* | 6/2006 | Ohk | H04N 1/41 382/176 |
| 2006/0274833 | A1* | 12/2006 | Kojokaro | H04N 19/14 375/240.16 |
| 2008/0037073 | A1* | 2/2008 | Fujimoto | H04N 1/40 358/471 |
| 2009/0154800 | A1* | 6/2009 | Kojima | H04N 19/117 382/165 |
| 2015/0002902 | A1* | 1/2015 | Akiba | G06K 15/102 358/2.1 |
| 2017/0054984 | A1* | 2/2017 | Park | H04N 19/124 |
| 2017/0070752 | A1* | 3/2017 | Kalevo | H04N 19/12 |
| 2018/0204111 | A1* | 7/2018 | Zadeh | G06N 3/0436 |
| 2019/0069007 | A1* | 2/2019 | Bodas | H04N 21/440236 |

FOREIGN PATENT DOCUMENTS

| | | |
|---|---|---|
| CN | 106686384 | 5/2017 |
| CN | 106888380 | 6/2017 |
| CN | 107509079 A | 12/2017 |
| CN | 107749989 | 3/2018 |
| CN | 107770539 | 3/2018 |
| JP | 2005184168 A | 7/2005 |
| WO | 20160199409 | 6/2016 |

OTHER PUBLICATIONS

State Intellectual Property Office of People's Republic of China, Notification of Search Report for Application No. 201810410250.0, report dated May 6, 2021, China.

English Translation of International Search Report dated Jul. 23, 2019; International Patent Application No. PCT/CN2019/084836 filed Apr. 28, 2019. ISA/CN.

Tong et al., "Effectively Compress Document-snapping Pictures Based on Content Analysis and Characteristic Extract." Radio Engineering of China, vol. 34, No. 11, pp. 8-10. (Nov. 30, 2004).

* cited by examiner

VIDEO ENCODING AND DECODING METHOD, DEVICE, AND SYSTEM, AND STORAGE MEDIUM

CROSS-REFERENCE TO RELATED APPLICATION

This application is a 35 U.S.C. 371 national stage filing of PCT Application No. PCT/CN2019/084836, filed on Apr. 28, 2019, which claims priority to Chinese patent application No. 201810410250.0 filed with CNIPA on May 2, 2018, the disclosures of which is are incorporated herein by reference in their entireties.

TECHNICAL FIELD

Embodiments of the present disclosure relate to, but are not limited to, the technical field of communications.

BACKGROUND

As cloud computing, virtual desktop and other technologies popularize, a large amount of data on a decoding terminal needs to be transmitted to a user terminal via a network for processing. In order to satisfy the transmission of desktop content in a network with narrow bandwidth, screen content-based video encoding technologies are widely applied in the field of virtual desktop.

SUMMARY

In an aspect of the embodiments of the present disclosure, a video encoding method is provided and includes: performing macroblock division on pixel data of a screen change area; classifying, according to pixel data in a macroblock, the divided macroblock as a text macroblock or an image macroblock; determining a compression type of the text macroblock according to color data in the text macroblock; and performing encoding and compression, according to the compression type of the text macroblock, on the text macroblock according to the compression type of the text macroblock, on the text macroblock with a corresponding compression quality. In another aspect of the embodiments of the present disclosure, a video decoding method is provided and includes: receiving and parsing an encapsulated packet sent by a video encoding apparatus, where the encapsulated packet carries compression data and a compression type of the compression data; and performing decoding processing on the compression data according to the compression type.

In another aspect of the embodiments of the present disclosure, a video encoding apparatus is provided and includes: a macro division module configured to perform macroblock division on pixel data of a screen change area; a macro classification module configured to classify, according to pixel data in a divided macroblock, the divided macroblock as a text macroblock or an image macroblock; a type determination module configured to determine a compression type of the text macroblock according to color data in the text macroblock; and an encoding module configured to perform encoding and compression, according to the compression type of the text macroblock, on the text macroblock with a corresponding compression quality.

In another aspect of the embodiments of the present disclosure, a video decoding apparatus is provided and includes: a receiving module configured to receive an encapsulated packet sent by a video encoding apparatus, where the encapsulated packet carries compression data and a compression type of the compression data; a parsing module configured to parse the encapsulated packet and acquire the compression type; and a decoding module configured to perform decoding processing on the compression data according to the compression type. In another aspect of the embodiments of the present disclosure, a video encoding and decoding system is provided and includes the video encoding apparatus according to the present disclosure and the video decoding apparatus according to the present disclosure.

In another aspect of the embodiments of the present disclosure, a storage medium is provided and stores one or more programs which, when executed by one or more processors, cause the one or more processors to perform the video encoding method according to the present disclosure.

In another aspect of the embodiments of the present disclosure, a storage medium is provided and stores one or more programs which, when executed by one or more processors, cause the one or more processors to perform the video decoding method according to the present disclosure.

Implementation of objects, the functional features and the advantages of the embodiments of the present disclosure will be further described with reference to the embodiments and drawings.

DETAILED DESCRIPTION

To make the problems to be solved, solutions and beneficial effects of the embodiments of the present disclosure more clearly, the embodiments of the present disclosure are further described below in detail in conjunction with the embodiments and the drawings. It is to be understood that the embodiments described herein are merely intended to explain the present disclosure, but is not intended to limit the present disclosure.

Classification encoding technologies for remote transmission are divided into two types. In the first type, the entire screen is roughly divided into equal areas and is roughly divided into areas of text and areas of pictures according to colors in the areas, then lossless compression is performed on the text and lossy compression is performed on the pictures. However, the lossless compression on the text cannot satisfy the transmission requirement in the case of low bandwidth. In the second type, in a video compression technology, intra-frame predicted macroblocks are classified to distinguish between text and images, and then high-frequency coefficients and low-frequency coefficients transformed by the text and the images are subjected to multi-level compression and transmission. However, such classification needs multiple times of compression, is not efficient for compressing the text, and has poor applicability, especially for a desktop office scenario involving a large amount of text.

The interactive characteristic of screen sharing imposes higher requirements for the definition of video encoding and the real-time transmission. For example, in the scenario of cloud desktop office, the screen content includes a large number of thin lines such as fonts, borders, etc., and some are even monochrome lines each with only one pixel. At present, the video encoding technology is not efficient in compressing discontinuous tone content such as text, has poor applicability, especially for the desktop office scenario involving a large amount of text.

The embodiments of the present disclosure provide a video encoding method and apparatus, a video decoding method and apparatus, a video encoding and decoding system, and a storage medium, so as to improve the compression efficiency of discontinuous tone content such as text, and improve the applicability of video encoding and decoding, especially for the desktop office scenario involving a large amount of text.

Figure 1:
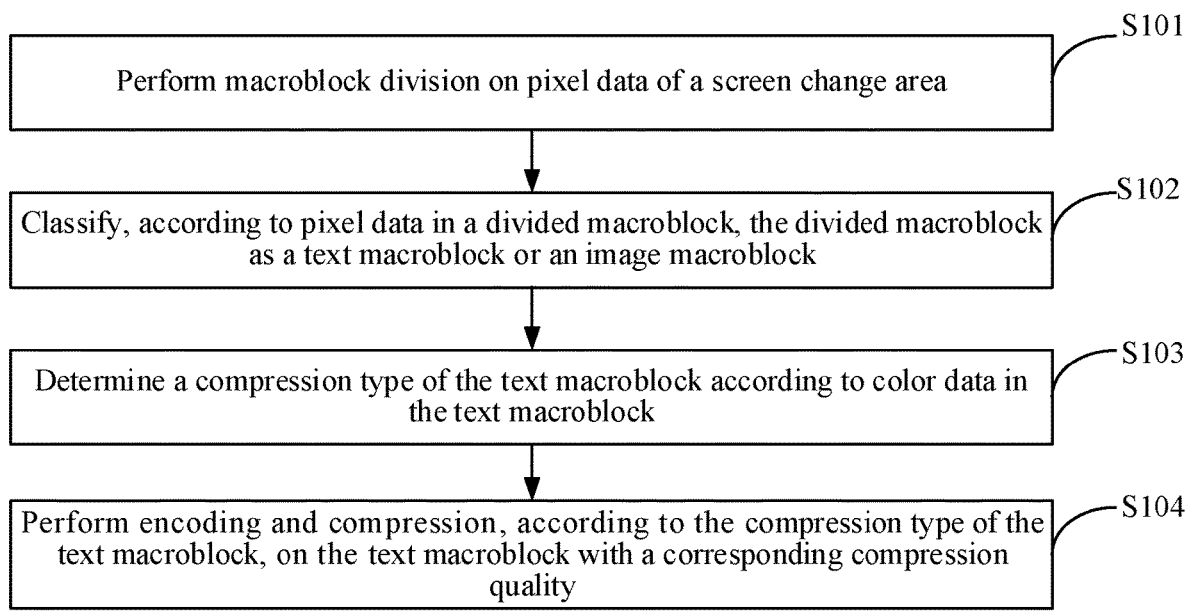
FIG. 1 is a flowchart illustrating a video encoding method according to an embodiment of the present disclosure.

FIG. 1 is a flowchart illustrating a video encoding method according to an embodiment of the present disclosure.

Referring to FIG. 1, the video encoding method according to an embodiment of the present disclosure includes steps S101 to S104.

In step S101, macroblock division is performed on pixel data of a screen change area.

In step S102, the divided macroblock is classified as a text macroblock or an image macroblock according to pixel data in the divided macroblock.

In step S103, a compression type of the text macroblock is determined according to color data in the text macroblock.

In step S104, according to the compression type of the text macroblock, encoding and compression is performed on the text macroblock with a corresponding compression quality.

In an embodiment, when step S101 is performed, as required by the encoder, the macroblock division may be performed according to a size of an encoding unit such as 16×16, 32×32, 64×64, etc.

In an embodiment, the step S102 may include: analyzing a gradient feature of pixel data distribution in the divided macroblock, and classifying, according to the gradient feature, the divided macroblock as the image macroblock or the text macroblock.

The pixel data of an image being gradual, the changing in gradient of pixel data is small. Text having many borders, the changing in gradient of pixel is large. Therefore, a threshold value may be set, macroblocks with gradient changes greater than the threshold value may be classified as text macroblocks, and the rest macroblocks may be classified as image macroblocks.

In an embodiment, the step S103 may include: establishing statistical information according to pixel data of the text macroblock; performing clarification on the text macroblock according to a color feature in the statistical information; and determining the compression type of each category of text macroblock according to differences between foreground colors and background colors in the color features of different categories of text macroblocks; where the compression type includes at least one of high lossy compression, moderate lossy compression, high definition lossy compression, lossy compression requiring compensation, or lossless compression.

Specifically, after the statistical information for pixels in the text macroblocks is established, several groups of data with the most combinations of luminance chrominance signals (YUV), for example, may be selected.

According to the color features, the text macroblocks may be classified into four categories: achromatic text macroblocks, red text macroblocks, blue text macroblocks, and mixed color text macroblocks (i.e., text macroblocks involving both red and blue).

For the determination of the compression type of a text macroblock of each category, the difference between the foreground color and background color of the text macroblock may be analyzed. The compression type of an achromatic text macroblock whose difference between the foreground color and the background color is greater than a first threshold value is determined as high lossy compression. The compression type of an achromatic text macroblock whose difference between the foreground color and the background color is less than or equal to the first threshold value and greater than a second threshold value is determined as moderate lossy compression. The compression type of a blue text macroblock which human eyes are sensitive to or a red text macroblock is determined as lossy compression requiring compensation. The compression type of a mixed color macroblock is determined as lossless compression. The compression type of other text macroblocks is determined as high definition lossy compression.

In an embodiment, when the encoding and compression is performed, according to the compression type of the text macroblock, on the text macroblock with the corresponding compression quality (i.e., step S104), an appropriate encoding mode and an appropriate encoding quality may be selected according to the compression type of the text macroblock to ensure the definition of a picture.

The encoding mode and the encoding quality may be selected by following principles described below. For a text macroblock whose compression type is high lossy compression, the text is achromatic, and the difference between the foreground and the background in brightness is great, so a higher compression quality may be used for compression without causing blur or color difference of the text. For a text macroblock whose compression type is moderate lossy compression, the text is achromatic, and the difference between the foreground and the background in brightness is not too small, so a moderate compression quality may be used for compression without causing blur or color difference of the text. For a text macroblock whose compression type is high definition lossy compression, the text is achromatic or same-color text, and the difference between the foreground and the background in brightness is very small, so a compression quality providing a higher definition needs to be used for compression so as not to cause blur. For a text macroblock whose compression type is lossy compression requiring compensation, the difference, in brightness, between the foreground and the background of the text is large. In the case of not 4:4:4 complete sampling, for the text easily subjected to color difference, chrominance compensation and correction should be performed when the incomplete sampling is recovered at the decoding terminal. In addition, for a text macroblock whose compression type is lossless compression, the foreground and background of the text both include colors and have a large difference in chrominance. In the case of not 4:4:4 complete sampling, blurred text is easy to be caused, so complete lossless compression is needed for compression.

In an embodiment, the step S104 may include: performing the encoding and compression, according to the compression type of the text macroblock, on the text macroblock with a corresponding compression ratio, where compression ratios of the high lossy compression, the moderate lossy compression, the high definition lossy compression, the lossy compression requiring compensation, and the lossless compression sequentially decrease.

The compression quality may be measured by the compression ratio for encoding. The compression ratios corresponding to the higher compression quality, the moderate compression quality, and the compression quality providing a higher definition sequentially decrease. That is, the compression ratio of the higher compression quality is greater than the compression ratio of the moderate compression quality, and the compression ratio of the moderate compression quality is greater than the compression ratio of the compression quality providing a higher definition. The compression ratios corresponding to different compression qualities may be selected according to actual needs.

In an embodiment, the video encoding method according to the present disclosure may further include: encapsulating an encoded and compressed text macroblock in a packet, where a compression type of the encoded and compressed text macroblock is carried in data of the encapsulated packet; and sending the encapsulated packet to a video decoding apparatus so that the video decoding apparatus performs decoding on the encapsulated packet.

Text macroblocks subjected to lossy compression and lossless compression may be distinguished, for example, by the "NAL type" field in data of the encapsulated packet. According to the video encoding method of the embodiment, the macroblock division is performed on pixel data of the screen change area, the compression type of the text macroblock is determined according to the color data in the text macroblock, and the encoding and compression is performed, according to different compression types, on text macroblocks with different compression qualities, so that a corresponding compression quality satisfying the definition of text is selected, a compression efficiency is improved as much as possible, and bandwidth is reduced, therefore, the present embodiment is available to the desktop office scenario involving a large amount of text.

Figure 2:
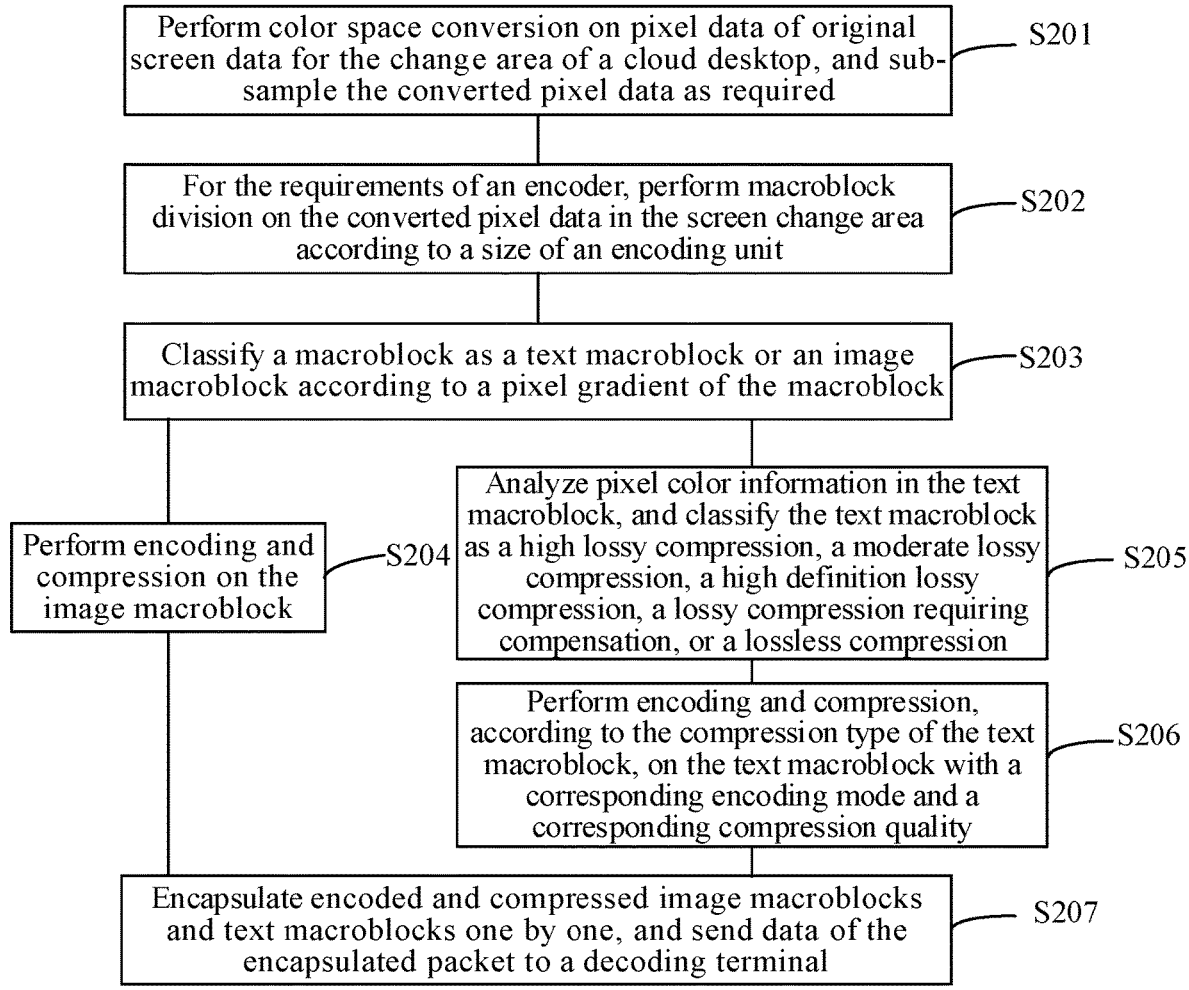
FIG. 2 is another flowchart illustrating a video encoding method according to an embodiment of the present disclosure.

FIG. 2 is another flowchart illustrating a video encoding method according to an embodiment of the present disclosure.

Referring to FIG. 2, another process of the video encoding method according to the embodiment of the present disclosure includes steps S201 to S207.

In step S201, color space conversion is performed on pixels of original screen data for the change area of a cloud desktop, and the converted data is sub-sampled as required. Data of the original pixels captured in the cloud desktop are based on RGB color space, and may be converted to YUV color space, where the YUV color space is required by video encoding, that is, the data of RGB color space is converted to the YUV color space, and the converted YUV data is sub-sampled as required. The YUV color space includes a luminance component, Y, and two chrominance components, U and V.

In step S202, For the requirements of an encoder, macroblock division is performed on the converted pixel data in the screen change area according to a size of an encoding unit.

In step S203, a macroblock is classified as a text macroblock or an image macroblock according to a pixel gradient of the macroblock.

In step S204, encoding and compression is performed on the image macroblock.

In step S205, pixel color information in the text macroblock is analyzed, and the text macroblock is classified as a high lossy compression, a moderate lossy compression, a high definition lossy compression, a lossy compression requiring compensation, or a lossless compression.

For the specific classification method, reference may be made to the aforementioned embodiment and repetition is not made here.

In step S206, encoding and compression is performed, according to the compression type of the text macroblock, on the text macroblock with a corresponding encoding mode and a corresponding compression quality.

If the compression type of a text macroblock is lossy compression (e.g., high lossy compression, moderate lossy compression, high definition lossy compression, and lossy compression requiring compensation), the encoding and compression is performed by selecting a corresponding compression quality (e.g., compression ratio) according to the encoding mode of lossy compression. If the compression type is lossless compression, the encoding and compression is performed according to the encoding mode of lossless compression.

In step S207, encoded and compressed image macroblocks and encoded and compressed text macroblocks are encapsulated one by one, and data of the encapsulated packet is sent to a decoding terminal.

In the step S207, data of encapsulated packets subjected to lossy compression and lossless compression need to be distinguished, for example, with different "NAL types".

The compression quality of a text macroblock may also be carried in the data of the encapsulated packet, so as to identify the compression type (including high lossy compression, moderate lossy compression, high definition lossy compression, and lossy compression requiring compensation) of the text macroblock. For example, a dedicated qp value may be used to identify the compression quality. A text macroblock and an image macroblock may also be distinguished by the qp value.

According to the video encoding method of the embodiment, the macroblock division is performed on pixel data of the screen change area, the compression type of the text macroblock is determined according to the color data in the text macroblock, and the encoding and compression is performed, according to different compression types, on text macroblocks with different compression qualities, so that a corresponding compression quality satisfying the definition of text is selected, a compression efficiency is improved as much as possible, and bandwidth is reduced, therefore, the present embodiment is available to the desktop office scenario involving a large amount of text.

Figure 3:
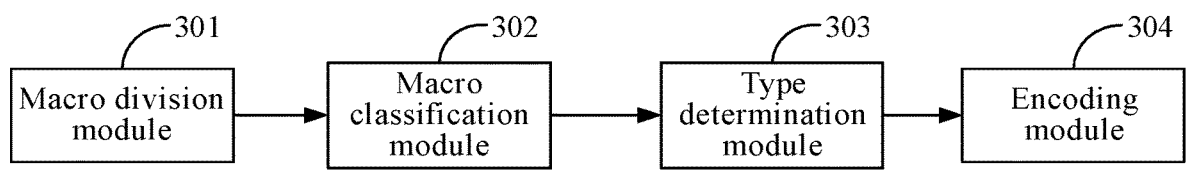
FIG. 3 is a schematic structure diagram illustrating modules of a video encoding apparatus according to an embodiment of the present disclosure.

FIG. 3 is a schematic structure diagram illustrating modules of a video encoding apparatus according to an embodiment of the present disclosure.

Referring to FIG. 3, the video encoding apparatus according to the embodiment of the present disclosure may include a macro division module 310, a macro classification module 302, a type determination module 303, and an encoding module 304.

The macro division module 301 is configured to perform macroblock division on pixel data of a screen change area.

The macro classification module 302 is configured to classify, according to pixel data in a macroblock, the divided macroblock as a text macroblock or an image macroblock.

The type determination module 303 is configured to determine a compression type of the text macroblock according to color data in the text macroblock.

The encoding module 304 is configured to perform encoding and compression, according to the compression type of the text macroblock, on the text macroblock with a corresponding compression quality.

In an embodiment, for the needs of an encoder, the macro division module 301 may be configured to perform the macroblock division according to a size of an encoding unit, such as 16×16, 32≠32, 64≠64, etc.

In an embodiment, the macro classification module 302 is further configured to analyze a gradient feature of pixel data distribution in the divided macroblock, and classify, according to the gradient feature, the divided macroblock as the image macroblock or the text macroblock.

In an embodiment, the type determination module 303 may include: a statistical sub-module configured to establish statistical information according to pixel data of the text macroblock; a classification sub-module configured to performing clarification on the text macroblock according to a color feature in the statistical information; and a compression type determination sub-module configured to determine the compression type of each category of text macroblock according to differences between foreground colors and background colors in the color features of different categories of text macroblocks; where the compression type includes at least one of high lossy compression, moderate lossy compression, high definition lossy compression, lossy compression requiring compensation, or lossless compression.

For the specific classification method, reference may be made to the aforementioned embodiment and repetition is not made here.

In an embodiment, the encoding module 304 is further configured to perform the encoding and compression, according to the compression type of the text macroblock, on the text macroblock with a corresponding compression ratio, where compression ratios of the high lossy compression, the moderate lossy compression, the high definition lossy compression, the lossy compression requiring compensation, and the lossless compression sequentially decrease.

In an embodiment, the video encoding apparatus according to the present disclosure further includes a packet encapsulation module configured to encapsulate an encoded and compressed text macroblock in a packet, where a compression type of the encoded and compressed text macroblock is carried in data of the encapsulated packet. The video encoding apparatus further includes a sending module configured to send the encapsulated packet to a video decoding apparatus so that the video decoding apparatus performs decoding on the encapsulated packet. Text macroblocks subjected to lossy compression and lossless compression may be distinguished, for example, with the "NAL type" field in data of the encapsulated packet.

The compression quality of a text macroblock may also be carried in the data of the encapsulated packet, so as to identify the compression type (including high lossy compression, moderate lossy compression, high definition lossy compression, and lossy compression requiring compensation) of the text macroblock. For example, a dedicated qp value may be used to identify the compression quality. A text macroblock and an image macroblock may also be distinguished by the qp value.

In an embodiment, the video encoding apparatus according to the present disclosure may further include a color conversion and sampling module configured to: before the macroblock division is performed, perform color conversion on original pixels of the desktop change area for conversion into color space used by the video encoding, and perform color sampling when necessary.

According to the video encoding apparatus of the embodiment, the macroblock division is performed on pixel data of the screen change area, the compression type of the text macroblock is determined according to the color data in the text macroblock, and the encoding and compression is performed, according to different compression types, on text macroblocks with different compression qualities, so that a corresponding compression quality satisfying the definition of text is selected, a compression efficiency is improved as much as possible, and bandwidth is reduced, therefore, the present embodiment is available to the desktop office scenario involving a large amount of text.

Figure 4:
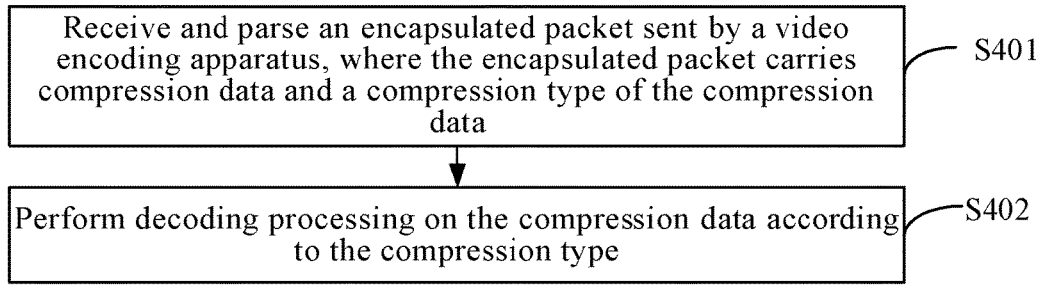
FIG. 4 is a flowchart illustrating a video decoding method according to an embodiment of the present disclosure.

FIG. 4 is a flowchart illustrating a video decoding method according to an embodiment of the present disclosure.

Referring to FIG. 4, the video decoding method according to the embodiment of the present disclosure includes steps S401 and S402.

In step S401, an encapsulated packet sent by a video encoding apparatus is received and parsed, where the encapsulated packet carries compression data and a compression type of the compression data.

In step S402, decoding processing is performed on the compression data according to the compression type.

It may be determined whether the compression type of the compression data is lossy compression or lossless compression according to, for example, the "NAL type" field in data of the encapsulated packet.

In an embodiment, the step S402 may include: if the compression type of the compression data is lossless compression, performing the decoding on the compression data in the mode of lossless compression; or if the compression type of the compression data is lossy compression, performing the decoding on the compression data in the mode of lossy compression.

According to the video decoding method of the embodiment, the decoding can be performed, according to compression types of text macroblocks, on text macroblocks with different compression qualities, so that the video decoding method is available to the desktop office scenario involving a large amount of text and the definition of text can be satisfied.

Figure 5:
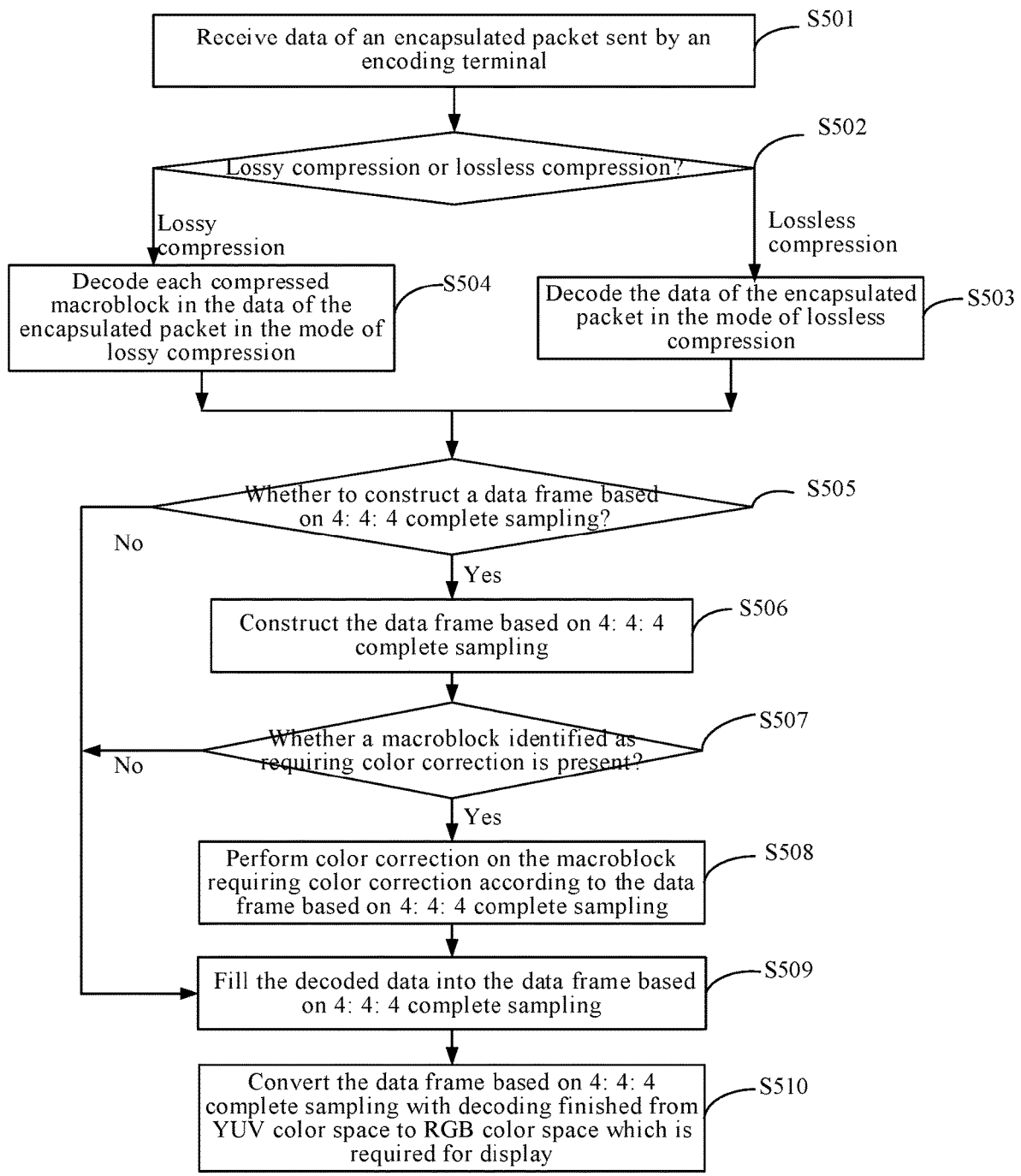
FIG. 5 is another flowchart illustrating a video decoding method according to an embodiment of the present disclosure.

FIG. 5 is another flowchart illustrating a video decoding method according to an embodiment of the present disclosure.

Referring to FIG. 5, another process of the video decoding method according to the embodiment of the present disclosure includes steps S501 to S510.

In step S501, data of an encapsulated packet sent by an encoding terminal is received.

In step S502, the received data of the encapsulated packet is parsed, and whether lossy compression or lossless compression is used is determined according to the "NAL type" field in the data of the encapsulated packet. If the lossless compression is used, step S503 is performed, and if the lossy compression is used, step S504 is performed.

In step S503, the data of the encapsulated packet is decoded in the mode of lossless compression.

In step S504, each compressed macroblock in the data of the encapsulated packet is decoded in the mode of lossy compression.

The compression quality of a text macroblock may also be carried in the data of the encapsulated packet, so as to identify the compression type (including high lossy compression, moderate lossy compression, high definition lossy compression, and lossy compression requiring compensation) of the text macroblock. For example, a dedicated qp value may be used to identify the compression quality. A text macroblock and an image macroblock may also be distinguished by the qp value.

During decoding, if the qp value identifies a macroblock as a text macroblock, the decoding terminal may use a preset algorithm to process the text macroblock to increase the display definition of the decoded text.

In step S505, according to the color sampling format of a current encoding terminal, it is determined whether a data frame based on 4:4:4 complete sampling needs to be constructed. If the data frame based on 4:4:4 complete sampling needs to be constructed, step S506 is performed; otherwise, step S509 is performed.

In practical application, step S505 is performed after decoding of all macroblocks is finished.

If the encoding terminal does not adopt the 4:4:4 complete sampling, the decoded lossless data needs to be sub-sampled in the same format as that at the encoding terminal, and the sub-sampled data needs to be filled into a decoded frame.

The basis for determining whether the data frame based on 4:4:4 complete sampling needs to be constructed is as follows: if the encoding terminal adopts the data frame based on 4:4:4 complete sampling, no construction is needed; if the sampling format of the encoding terminal is 4:2:2 sub-sampling or 4:2:0 sub-sampling, the data decoded by the decoding terminal is 4:2:2 YUV data or 4:2:0 YUV data, and at this time, the data frame based on 4:4:4 complete sampling needs to be constructed to store complete YUV data.

It is to be noted that the data frame based on 4:4:4 complete sampling is only used for display on the client and is not used as a reference for the decoding terminal.

In step S506, the data frame based on 4:4:4 complete sampling is constructed.

In a data frame based on complete sampling, pixel data needs to be expanded, corrected and backfilled.

In step S507, it is determined that whether a macroblock identified as requiring color correction is present among lossy decoded macroblocks, and if such macroblock exists, step S508 is performed; otherwise step S509 is performed.

In step S508, color correction is performed on the macroblock requiring color correction according to the data frame based on 4:4:4 complete sampling.

In step S509, the decoded data is filled into the data frame based on 4:4:4 complete sampling.

In step S510, the data frame based on 4:4:4 complete sampling with decoding finished is converted from YUV color space to RGB color space, where the RGB color space is required for display.

According to the video decoding method of this embodiment, the decoding can be performed, according to compression types of text macroblocks, on text macroblocks with different compression qualities, so that the video decoding method is available to the desktop office scenario involving a large amount of text and the definition of text can be satisfied.

Figure 6:
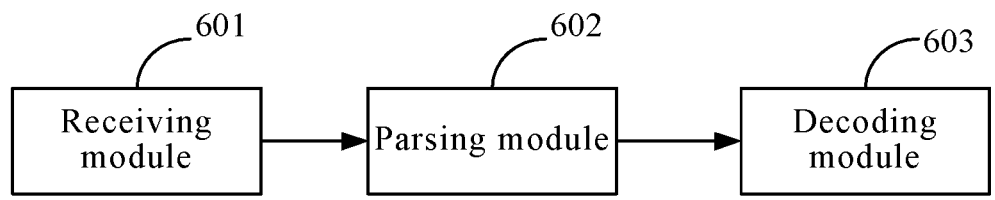
FIG. 6 is a schematic structure diagram illustrating modules of a video decoding apparatus according to an embodiment of the present disclosure.

FIG. 6 is a schematic structure diagram illustrating modules of a video decoding apparatus according to an embodiment of the present disclosure.

Referring to FIG. 6, the video decoding apparatus according to the embodiment of the present disclosure includes a receiving module 601, a parsing module 602, and a decoding module 603. The receiving module 601 is configured to receive an encapsulated packet sent by a video encoding apparatus, where the encapsulated packet carries compression data and a compression type of the compression data.

The parsing module 602 is configured to parse the encapsulated packet and acquire the compression type.

The decoding module 603 is configured to perform decoding processing on the compression data according to the compression type.

The video decoding apparatus according to the embodiment of the present disclosure can perform the video decoding method according to the present disclosure, and the specific decoding process is not repeated here.

In an embodiment, the video decoding apparatus according to the embodiment of the present disclosure further includes a data recovery module configured to create a data frame based on complete sampling as required, and expand, correct and backfill the decoded pixel data in the data frame based on complete sampling.

For the specific creation process, reference may be made to the aforementioned embodiment, and repetition is not made here.

In an embodiment, the video decoding apparatus according to the embodiment of the present disclosure further includes a color conversion module configured to perform color conversion on pixel data in the data frame based on 4:4:4 complete sampling according to color space requirements required for final display.

According to the video decoding apparatus of this embodiment, the decoding can be performed, according to compression types of text macroblocks, on text macroblocks with different compression qualities, so that the video decoding method is available to the desktop office scenario involving a large amount of text and the definition of text can be satisfied.

Figure 7:
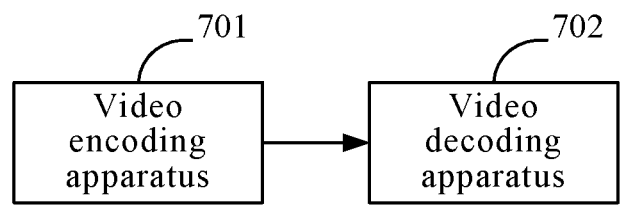
FIG. 7 is a schematic diagram illustrating a video encoding and decoding system according to an embodiment of the present disclosure.

FIG. 7 is a schematic diagram illustrating a video encoding and decoding system according to an embodiment of the present disclosure.

Referring to FIG. 7, the video encoding and decoding system according to the embodiment of the present disclosure includes a video encoding apparatus 701 and a video decoding apparatus 702.

The video encoding apparatus 701 can be implemented as the video encoding apparatus according to any embodiment of the present disclosure and the video decoding apparatus 702 can be implemented as the video decoding apparatus according to any embodiment of the present disclosure.

By the video encoding and decoding system of this embodiment, the macroblock division is performed on pixel data of the screen change area, the compression type of the text macroblock is determined according to the color data in the text macroblock, and the encoding and compression is performed, according to different compression types, on text macroblocks with different compression qualities, so that a corresponding compression quality satisfying the definition of text is selected, a compression efficiency is improved as much as possible, and bandwidth is reduced, therefore, the present embodiment is available to the desktop office scenario involving a large amount of text.

A storage medium is further provided in an embodiment of the present disclosure. The storage medium is configured to store one or more programs which, when executed by one or more processors, cause the one or more processors to perform the video encoding method according to any embodiment of the present disclosure.

A storage medium is further provided in an embodiment of the present disclosure. The storage medium is configured to store one or more programs which, when executed by one or more processors, cause the one or more processors to perform the video decoding method according to any embodiment of the present disclosure.

The embodiments of the present disclosure are described with reference to drawings and are not intended to limit the scope of the present disclosure. Any modification, equivalent substitution and improvement made by those skilled in the art without departing from the scope and substantive content of the present disclosure are within the scope of the present disclosure.

What is claimed is:

1. A video encoding method, comprising:
    performing macroblock division on pixel data of a screen change area;
    classifying, according to pixel data in a divided macroblock, the divided macroblock as a text macroblock or an image macroblock;
    determining a compression type of the text macroblock according to color data in the text macroblock; and
    performing encoding and compression, according to the compression type of the text macroblock, on the text macroblock with a corresponding compression quality;
    wherein the step of determining the compression type of the text macroblock according to the color data in the text macroblock comprises:
    establishing statistical information according to pixel data of the text macroblock;
    performing clarification on the text macroblock according to a color feature in the statistical information; wherein a category of the classified text macroblock comprises at least one of: an achromatic text macroblock, a red text macroblocks, a blue text macroblock, or a mixed color text macroblock; and
    determining the compression type of each category of text macroblock according to a difference between a foreground color and a background color in color features of different categories of text macroblocks;
    wherein the determining the compression type of each category of text macroblock according to a difference between a foreground color and a background color in color features of different categories of text macroblocks comprises at least one of the following:
    determining the compression type of the achromatic text macroblock whose difference between the foreground color and the background color is greater than a first threshold value as a high lossy compression;
    determining the compression type of the achromatic text macroblock whose difference between the foreground color and the background color is less than or equal to the first threshold value and greater than a second threshold value as a moderate lossy compression;
    determining the compression type of the blue text macroblock or the red text macroblock as a lossy compression requiring compensation; or
    determining the compression type of the mixed color macroblock as a lossless compression;
    wherein compression ratios of the high lossy compression, the moderate lossy compression, the high definition lossy compression, the lossy compression requiring compensation, and the lossless compression sequentially decrease.

2. The video encoding method of claim 1, wherein the step of classifying, according to the pixel data in the divided macroblock, the divided macroblock as the text macroblock or the image macroblock comprises:
    analyzing a gradient feature of pixel data distribution in the divided macroblock, and classifying, according to the gradient feature, the divided macroblock as the image macroblock or the text macroblock.

3. The video encoding method of claim 1, wherein the step of performing encoding and compression, according to the compression type of the text macroblock, on the text macroblock with the corresponding compression quality comprises:
    performing encoding and compression, according to the compression type of the text macroblock, on the text macroblock with a corresponding compression ratio.

4. The video encoding method of claim 1, further comprising:
    encapsulating an encoded and compressed text macroblock in a packet, wherein a compression type of the encoded and compressed text macroblock is carried in data of the encapsulated packet; and
    sending the encapsulated packet to a video decoding apparatus so that the video decoding apparatus performs decoding on the encapsulated packet.

5. A video encoding apparatus, comprising:
    a first processor; and
    a first memory for storing instructions executable by the first processor,
    wherein the first processor is configured to:
    perform macroblock division on pixel data of a screen change area;
    classify, according to pixel data in a divided macroblock, the divided macroblock as a text macroblock or an image macroblock;
    establish statistical information according to pixel data of the text macroblock;
    perform clarification on the text macroblock according to a color feature in the statistical information; wherein a category of the classified text macroblock comprises at least one of: an achromatic text macroblock, a red text macroblocks, a blue text macroblock, or a mixed color text macroblock;
    determine a compression type of each category of text macroblock according to a difference between a foreground color and a background color in color features of different categories of text macroblocks; and
    perform encoding and compression, according to the compression type of the text macroblock, on the text macroblock with a corresponding compression quality;
    wherein the first processor is configured to determine a compression type of each category of text macroblock according to a differences between a foreground color and a background color in color features of different categories of text macroblocks in at least one of the followings manners;
    wherein the determining the compression type of each category of text macroblock according to a difference between a foreground color and a background color in color features of different categories of text macroblocks comprises at least one of the following;
    determining the compression type of the achromatic text macroblock whose difference between the foreground color and the background color is greater than a first threshold value as a high lossy compression;

determining the compression type of the achromatic text macroblock whose difference between the foreground color and the background color is less than or equal to the first threshold value and greater than a second threshold value as a moderate lossy compression;

determining the compression type of the blue text macroblock or the red text macroblock as a lossy compression requiring compensation; or determining the compression type of the mixed color macroblock as a lossless compression;

wherein compression ratios of the high lossy compression, the moderate lossy compression, the high definition lossy compression, the lossy compression requiring compensation, and the lossless compression sequentially decrease.

6. The video encoding apparatus of claim 5, wherein the first processor is configured to classify, according to pixel data in a divided macroblock, the divided macroblock as a text macroblock or an image macroblock in the following manner:

analyzing a gradient feature of pixel data distribution in the divided macroblock, and classifying, according to the gradient feature, the divided macroblock as the image macroblock or the text macroblock.

7. The video encoding apparatus of claim 5, wherein the first processor is configured to perform encoding and compression, according to the compression type of the text macroblock, on the text macroblock with the corresponding compression quality in the following manner: performing encoding and compression, according to the compression type of the text macroblock, on the text macroblock with a corresponding compression ratio.

8. The video encoding apparatus of claim 5, wherein the first processor is further configured to:

encapsulate an encoded and compressed text macroblock in a packet, wherein a compression type of the encoded and compressed text macroblock is carried in data of the encapsulated packet; and send the encapsulated packet to a video decoding apparatus so that the video decoding apparatus performs decoding on the encapsulated packet.

9. A video encoding and decoding system, comprising the video encoding apparatus of claim 5 and a video decoding apparatus:

wherein the video decoding apparatus comprises:
a second processor; and
a second memory for storing instructions executable by the processor,
wherein the second processor is configured to:
receive an encapsulated packet sent by a video encoding apparatus, wherein the encapsulated packet carries compression data and a compression type of the compression data;
parse the encapsulated packet and acquire the compression type; and
perform decoding processing on the compression data according to the compression type.

10. A non-transitory storage medium storing one or more programs which, when executed by one or more processors, cause the one or more processors to:

perform macroblock division on pixel data of a screen change area;

classify, according to pixel data in a divided macroblock, the divided macroblock as a text macroblock or an image macroblock;

establish statistical information according to pixel data of the text macroblock;

perform clarification on the text macroblock according to a color feature in the statistical information; wherein a category of the classified text macroblock comprises at least one of: an achromatic text macroblock, a red text macroblocks, a blue text macroblock, or a mixed color text macroblock;

determine a compression type of each category of text macroblock according to a difference between a foreground color and a background color in color features of different categories of text macroblocks; and perform encoding and compression, according to the compression type of the text macroblock, on the text macroblock with a corresponding compression quality;

wherein the one or more programs which, when executed by one or more processors, cause the one or more processors to determine a compression type of each category of text macroblock according to a difference between a foreground color and a background color in color features of different categories of text macroblocks in at least one of the followings manners:

wherein the determining the compression type of each category of text macroblock according to a difference between a foreground color and a background color in color features of different categories of text macroblocks comprises at least one of the following:

determining the compression type of the achromatic text macroblock whose difference between the foreground color and the background color is greater than a first threshold value as a high lossy compression;

determining the compression type of the achromatic text macroblock whose difference between the foreground color and the background color is less than or equal to the first threshold value and greater than a second threshold value as a moderate lossy compression;

determining the compression type of the blue text macroblock or the red text macroblock as a lossy compression requiring compensation; or determining the compression type of the mixed color macroblock as a lossless compression;

wherein compression ratios of the high lossy compression, the moderate lossy compression, the high definition lossy compression, the lossy compression requiring compensation, and the lossless compression sequentially decrease.

11. The non-transitory storage medium of claim 10, wherein the processor is caused to classify, according to pixel data in a divided macroblock, the divided macroblock as a text macroblock or an image macroblock in the following manner:

analyzing a gradient feature of pixel data distribution in the divided macroblock, and classifying, according to the gradient feature, the divided macroblock as the image macroblock or the text macroblock.

12. The non-transitory storage medium of claim 10, wherein the processor is caused to perform encoding and compression, according to the compression type of the text macroblock, on the text macroblock with the corresponding compression quality in the following manner: performing encoding and compression, according to the compression type of the text macroblock, on the text macroblock with a corresponding compression ratio.

13. The non-transitory storage medium of claim 10, wherein the processor is further caused to:

encapsulate an encoded and compressed text macroblock in a packet, wherein a compression type of the encoded and compressed text macroblock is carried in data of the encapsulated packet; and send the encapsulated packet to a video decoding apparatus so that the video decoding apparatus performs decoding on the encapsulated packet.

\* \* \* \* \*